United States Patent [19]
Isaacson

[11] 3,788,626
[45] Jan. 29, 1974

[54] DAMPENED SHOCK ABSORBING BUMPER

[75] Inventor: Manfred A. Isaacson, Pontiac, Mich.

[73] Assignee: General Motors Corporation, Detroit, Mich.

[22] Filed: Dec. 26, 1972

[21] Appl. No.: 318,367

[52] U.S. Cl..................... 267/9 C, 188/129, 293/89
[51] Int. Cl............................................... F16f 7/08
[58] Field of Search............ 267/9 R, 9 A, 9 B, 9 C; 188/129, 1 B; 293/70, 89

[56] References Cited
UNITED STATES PATENTS
2,570,370   10/1951   O'Connor........................... 267/9 A
2,844,366   7/1958    Butterfield......................... 267/9 C FOREIGN PATENTS OR APPLICATIONS
1,096,602   6/1955   France................................ 188/129

*Primary Examiner*—Robert J. Spar
*Assistant Examiner*—Robert Saifer
*Attorney, Agent, or Firm*—Herbert Furman

[57] ABSTRACT

An impact energy absorbing device includes a cylinder having a cylindrical friction shoe slidable therein. A ram is slidably guided in the cylinder and has a ramped cylindrical surface spaced radially from the friction shoe. An annular member of substantially incompressible elastomeric material fills the radial space between the ram and the friction shoe and is axially confined between the ram and friction shoe. A Belleville spring carried by the ram exerts an axially compressing preload force on the annular member whereby the ramped cylindrical surface of the ram radially cams the annular member against the friction shoe to preload the friction shoe against the tubular member so that upon telescoping movement of the ram into the tubular member upon impact, the friction shoe is self-energized against the tubular member.

2 Claims, 4 Drawing Figures

PATENTED JAN 29 1974 3,788,626

DAMPENED SHOCK ABSORBING BUMPER

The invention relates to an improved friction type energy absorbing device and more particularly to an energy absorbing device in which axial movement between telescopable impact receiving members energizes the engagement of a friction shoe carried by one of the members against the other member.

It is advantageous in automotive vehicle collapsible steering columns and bumper mounts, and in diverse other applications to provide a mechanism capable of absorbing kinetic impact energy. Furthermore, it is desirable to provide an impact energy absorbing device which restores itself to its pre-impact condition so that it may repeat its energy absorbing function upon subsequent impacts. It is also desirable that an energy absorber provide maximum energy absorbing effectiveness by providing a uniform resistance to movement between impact receiving bodies through the entire distances of such movement.

United States patent application, Ser. No. 176,830, now U.S. Pat. No. 3,741,560, filed Sept. 1, 1971, by Albert L. Schaller, entitled "Dampened Shock Absorbing Bumper" and assigned to the common assignee, relates to an impact energy absorbing device including a tubular member, a generally cup-shaped friction shoe slidable in the tubular member, a ram received in one end of the tubular member and having a bullet-shaped nose which is slidably received in the cup-shaped friction shoe, an elastomeric material filling the space between the bullet-shaped nose and the friction shoe, and spring means acting between the friction shoe on the other end of the tubular member to yieldably resist telescoping movement of the ram and friction shoe into the tubular member upon application of impact force thereto so that the friction shoe is radially expanded against the tubular member by radial displacement of the elastomeric material.

The present invention features an improvement over the aforementioned device in that a self-energizing feature is provided which effects radial displacement of the elastomeric member to brake movement of the ram into the cylinder without the aid of a brake energizing spring means resisting movement of the ram and friction shoe into the cylinder.

In the preferred embodiment of the invention a pair of tubular members or cylinders are arranged for telescopic movement relative to one another upon application of impact force thereto. A cylindrical friction shoe is slidable within the outer of the cylinders and the axially extending wall thereof may be slotted to promote radial expansion of the friction shoe against the wall of the outer tubular member. A frusto-conical ram having a ramped cylindrical surface is mounted on the end of the inner tubular member. An annular elastomeric element fills the space between the ramped cylindrical surface of the frusto-conical ram and the cylindrical wall of the friction shoe. The annular elastomeric member is axially confined between a radially extending wall of the ram and a ring carried on the friction shoe and slidably engaging a cylindrical portion of the ram located forwardly the ramped cylindrical surface thereof. A spring acts between the ram and the friction shoe to urge the friction shoe and annular elastomeric member up the ramped cylindrical surface and thus radially outward against the inner wall of the outer tubular member to preload the friction shoe against the outer tubular member. Upon impact the ram is telescoped into the outer tubular member. The radial preload of the friction shoe against the outer tubular member frictionally impedes axial movement of the friction shoe and annular elastomeric member with the ram. The ramped cylindrical surface of the ram mechanically cams the annular elastomeric member radially outwardly and axially compresses the annular elastomeric member causing its radially outward displacement in a hydraulic sense to increase the radial force of the friction shoe against the outer tubular member. When the impact force is relieved, the tubular members are returned to their pre-impact condition upon application thereto of a restoring force sufficient to overcome the frictional force resulting from preload of the spring. For this purpose a restoring spring may be located between the ram and the outer tubular member so as to be compressed during the energy absorbing stroke. When the impact force is relieved, the restoring spring extends to its original length to restore the pre-impact axial condition between the tubular members.

These and other features, objects and advantages of the invention will be readily apparent from the following specification and from the drawings in which.

Figure 1:
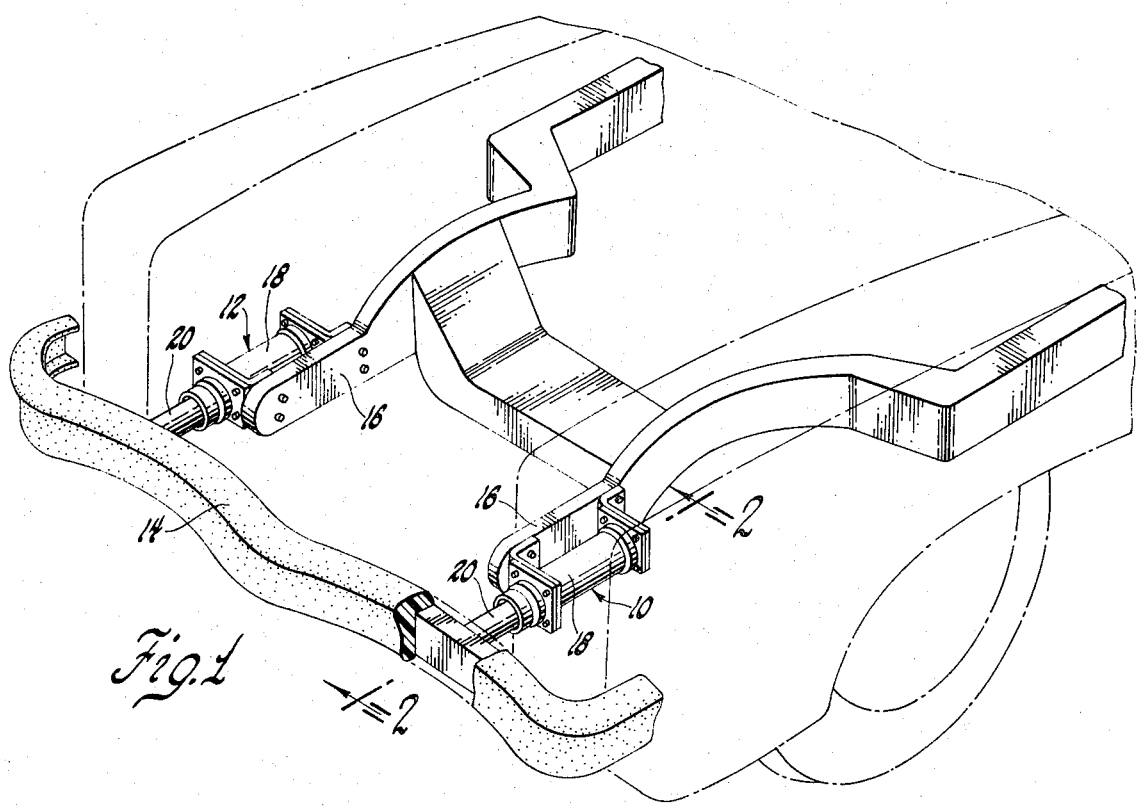
FIG. 1 is a perspective view having parts broken away and in section showing a pair of energy absorbers embodying the invention and arranged in connection between the vehicle frame and a bumper assembly.

Referring to FIG. 1, the invention is shown arranged for use within an energy absorbing bumper system, a use for which the invention is particularly well-suited, although by no means limited. A pair of energy absorbing devices, generally indicated at 10 and 12, are constructed according to the invention and mount a bumper or impact bar 14 to a vehicle frame member 16. The energy absorbers 10 and 12 are laterally spaced either side of the longitudinal centerline of the vehicle.

Figure 2:
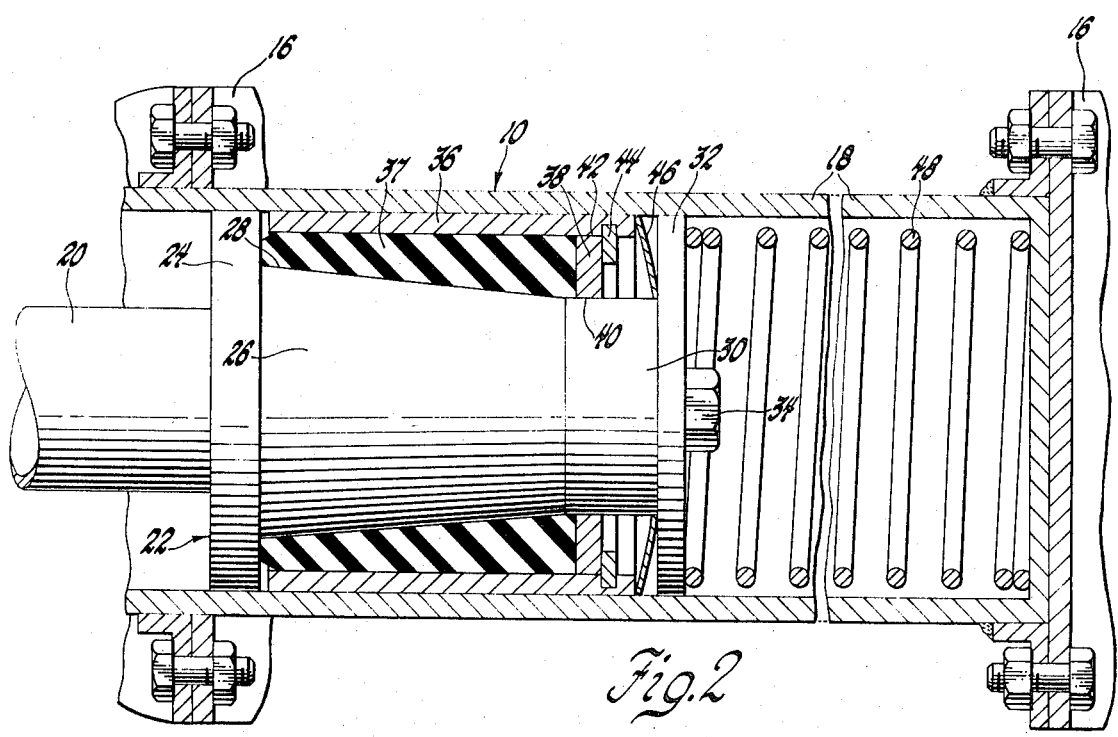
FIG. 2 is a longitudinal sectional view taken in the directions of arrows 2—2 of FIG. 1 showing the energy absorber poised in condition for impacting.

With reference to FIG. 2, the energy absorber 10, the following description of which would be understood as applying identically to the energy absorber 12, includes an outer tubular member or cylinder 18 suitably connected to frame 16 as by bolting, and an inner tubular member or cylinder 20 suitably connected to the bumper 14. The tubular members 18 and 20 are arranged generally concentrically with the inner tubular member 20 extending inside the outer tubular member 18. A ram 22 is attached to the end of the inner tubular member 20 and includes a circular plate 24 which is slidable in the outer tubular member 18, a frusto-conical portion 26 having a ramped cylindrical surface 28, and a circular cylindrical portion 30. A circular plate 32 is attached to the rightward end of the circular cylindrical portion 30 by a conventional fastener such as bolt 34 and slidably guides the ram 22 in the outer cylinder 18.

An annular or cylindrical friction shoe 36 is slidably received within the outer tubular member 18 intermediate the plates 24 and 32 and is of such length as to be normally spaced at its ends from the plates 24 and 32.

The cylindrical friction shoe 36 is preferably slotted at circumferential intervals to promote radial expansion thereof.

An annular member 37 of elastomeric material or a substantially incompressible material with relatively low modulus of elasticity is located in the space between the cylindrical ramped surface 28 of ram 22 and the cylindrical friction shoe 36. The annular elastomeric member 37 is axially confined at its leftward end by the circular plate 24 and at its rightward end by a ring 38 which is in slidable contact at its bore 40 with the cylindrical portion 30 of ram 26 and in sliding contact at its outer surface 42 with the friction shoe 36. A snap ring 44 is mounted in a groove of the friction shoe 36 and holds the ring 38 against the annular member 37.

A Belleville spring 46 acts between the brake shoe 36 and circular plate 32 urging the friction shoe 36, ring 38, and thus the annular elastomeric member 37 leftwardly causing the annular elastomeric member 37 to be axially compressed and cammed radially outward to force the friction shoe 36 against the outer tubular member 18. It is noted that in the unimpacted condition as shown in FIG. 2, the leftward end of the friction shoe 36 is spaced axially somewhat from the circular plate 24. A restoring spring 48 acts between circular plate 32 and the end of outer tubular member 18.

Figure 3:
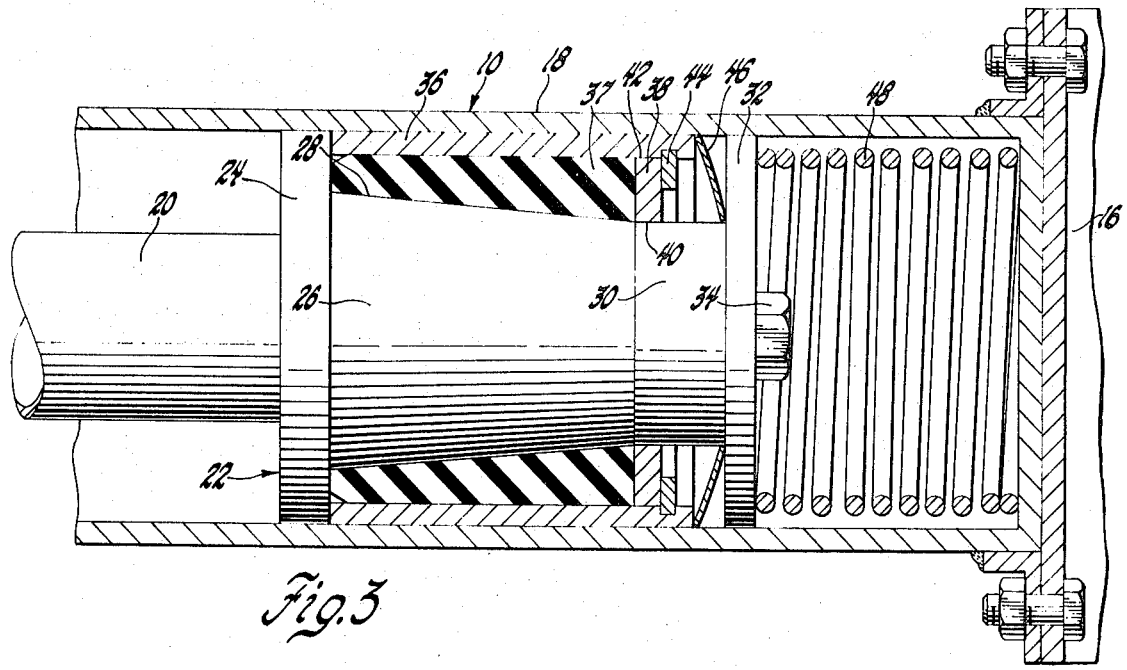
FIG. 3 is an enlarged fragmentary view similar to FIG. 2 and showing the energy absorber during impact.

In operation, when the bumper 14 collides with a resisting object, the energy absorbers 10 and 12 are loaded in axial compression by the impact force, causing inner tubular member 20 to telescope into outer tubular member 18. Sudden telescoping movement of inner tubular member 20 and ram 22 by the impact force tries to move annular elastomeric member 37 and friction shoe 36. The preload of friction shoe 36 against the outer tubular member 18 resists such movement of the friction shoe 36. Thus, as seen in FIG. 3, the ram 22 moves rightwardly relative the friction shoe 36 causing the ramped cylindrical surface 28 to cam annular elastomeric member 37 radially outwardly and increase the force of friction shoe 36 against the outer tubular member 18. Furthermore, such axial movement of the ram 22 relative the friction shoe 36 causes the annular elastomeric member 37 to be axially compressed between ring 38 and the circular plate 24 causing the relatively incompressible annular elastomeric member 37 to act in a manner analogous to a hydraulic fluid and thereby contribute to the radially outward displacement of the friction shoe 36 against the outer cylinder 18. Thus, it is seen that the energy absorber of this invention is self-energizing.

Figure 4:
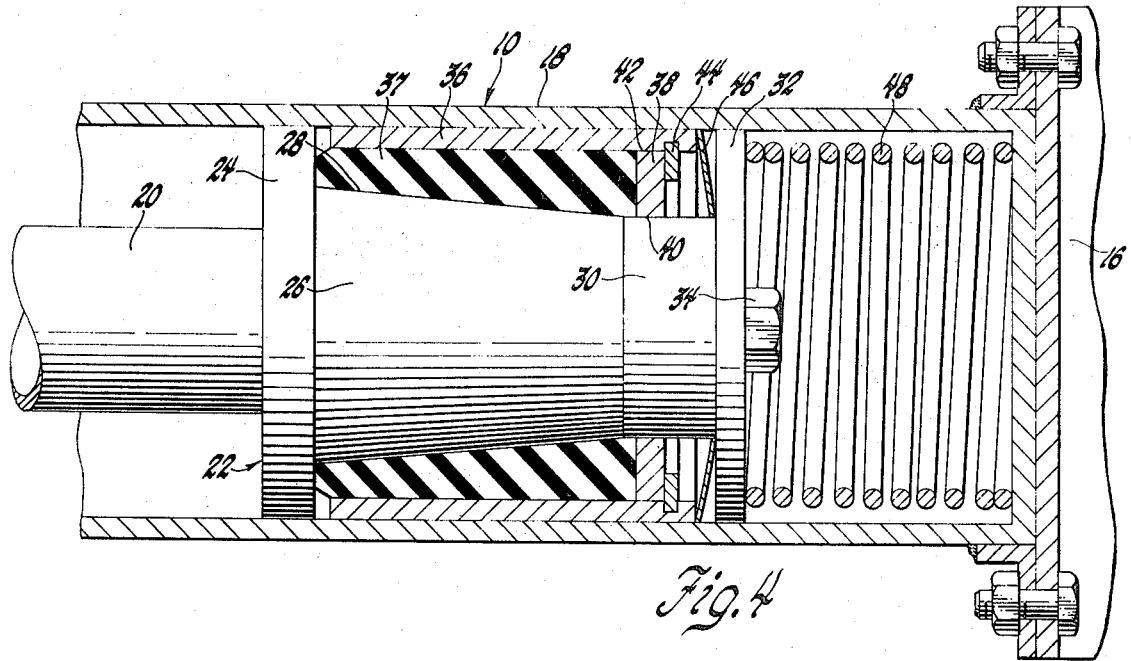
FIG. 4 is a view similar to FIG. 3 showing the energy absorber during the restoring mode of operation.

FIG. 4 shows the energy absorber during the restoration stroke. When the impact force is relieved from the bumper 14 and frame member 16, the force on the annular elastomeric member 37 is relieved. The force of the friction shoe 36 against the outer tubular member 18 then once again assumes the magnitude of the preload determined by the Belleville spring 46. The restoring spring 48 which has been compressed during the impact stroke, then overcomes the preloaded force of the friction shoe 36 against the outer cylinder 18 to move the ram 22 and inner tubular member 20 leftwardly to the pre-impact condition. The restoring spring 48 is limited in strength to that level necessary to impart restoring movement to the ram and inner tubular member so as to have a minimum effect during the impact stroke of the energy absorber.

Thus, it is seen that an improved friction type energy absorber is provided wherein a self-energizing friction type energy absorber is provided without the aid of a brake energizing spring resisting movement of the ram and friction shoe into the tubular member.

What is claimed is:

1. An energy absorber comprising a tubular member, a cylindrical friction shoe in the tubular member and having a radially expandible wall frictionally engageable with the tubular member, a ram slidably guided in the tubular member and having a ramped cylindrical surface spaced radially from the cylindrical friction shoe, an annular member of substantially incompressible elastomeric material in the radial space between the ram and the friction shoe, means on the ram and the friction shoe acting to axially confine the annular member, and spring means carried by the ram exerting an axially compressing preload force on the annular member whereby the ramped cylindrical surface of the ram radially cams the annular member against the friction shoe to preload the friction shoe against the tubular member so that upon telescoping movement of the ram into the tubular member the friction shoe is self-energized against the tubular member.

2. An energy absorber comprising a tubular member, a cylindrical friction shoe in the tubular member and having a radially expandible wall frictionally engageable with the tubular member, a ram slidably guided in the tubular member and having a ramped cylindrical surface spaced radially from the cylindrical friction shoe, an annular member of substantially incompressible elastomeric material in the radial space between the ram and the friction shoe, means on the ram and the friction shoe acting to axially confine the annular member, restoring spring means acting between the ram and the tubular member, and spring means carried by the ram exerting an axially compressing preload force on the annular member whereby the ramped cylindrical surface of the ram radially cams the elastomeric material against the friction shoe to preload the friction shoe against the tubular member so that upon impact induced telescoping movement of the ram into the tubular member the friction shoe is self-energized against the tubular member, the restoring spring means being compressed during such telescoping movement and acting to restore the ram to the pre-impact position in the tubular member.

* * * * *